United States Patent
Wang et al.

(10) Patent No.: US 11,321,307 B2
(45) Date of Patent: May 3, 2022

(54) ORCHESTRATED CONSENSUS VALIDATION FOR DISTRIBUTED LEDGERS USING HETEROGENEOUS VALIDATION POOLS

(71) Applicant: Optum, Inc., Minnetonka, MN (US)

(72) Inventors: Jianping Wang, San Diego, CA (US); Soleh Udin Al Ayubi, Newton, MA (US); Rick A. Hamilton, Charlottesville, VA (US); Michael N. Jacobs, Jordan, MN (US)

(73) Assignee: Optum, Inc., Minnetonka, MN (US)

( * ) Notice: Subject to any disclaimer, the term of this patent is extended or adjusted under 35 U.S.C. 154(b) by 158 days.

(21) Appl. No.: 16/451,619

(22) Filed: Jun. 25, 2019

(65) Prior Publication Data

US 2020/0409937 A1 Dec. 31, 2020

(51) Int. Cl.
 *G06F 16/23* (2019.01)

(52) U.S. Cl.
 CPC ...... *G06F 16/2379* (2019.01); *G06F 16/2365* (2019.01)

(58) Field of Classification Search
 CPC ............ G06F 16/2379; G06F 16/2365; H04L 2209/38; H04L 67/10; H04L 2209/56; H04L 63/12
 USPC ........................................................ 707/703
 See application file for complete search history.

(56) References Cited

U.S. PATENT DOCUMENTS

| | | | |
|---|---|---|---|
| 10,158,479 B2 | 12/2018 | Chapman et al. | |
| 10,158,527 B2 | 12/2018 | Anderson et al. | |
| 2016/0224949 A1 | 8/2016 | Thomas et al. | |
| 2017/0075941 A1 | 3/2017 | Finlow-Bates | |
| 2017/0163645 A1* | 6/2017 | Bradley | H04L 67/1061 |
| 2017/0236120 A1 | 8/2017 | Herlihy et al. | |
| 2017/0243177 A1 | 8/2017 | Johnsrud et al. | |
| 2017/0244757 A1 | 8/2017 | Castinado et al. | |
| 2018/0225194 A1 | 8/2018 | Saleh-Esa et al. | |
| 2018/0276666 A1 | 9/2018 | Haldenby et al. | |
| 2018/0337882 A1* | 11/2018 | Li | H04L 9/3236 |
| 2019/0026146 A1 | 1/2019 | Peffers et al. | |
| 2019/0058581 A1 | 2/2019 | Wood et al. | |
| 2019/0089525 A1 | 3/2019 | Roets | |
| 2019/0108140 A1 | 4/2019 | Deshpande et al. | |

(Continued)

FOREIGN PATENT DOCUMENTS

| | | |
|---|---|---|
| WO | 2016/025080 A1 | 2/2016 |
| WO | 2018/229633 A1 | 12/2018 |

OTHER PUBLICATIONS

Hidde Lycklama A Nijeholt, et al., DecReg: A Framework for Preventing Double-Financing using Blockchain Technology, Apr. 1, 2017, BCC'17 Proceedings of the ACM Workshop on Blockchain, Cryptocurrencies and Contract, 7 pages, https://www.researchgate.net/publication/315854494_DecReg_A_Framework_for_Preventing_Double-Financing_using_Blockchain_Technology,link/5b3e02fe0f7e9b0df5f49a78/download.

(Continued)

*Primary Examiner* — Hares Jami
(74) *Attorney, Agent, or Firm* — Alston & Bird LLP (57) ABSTRACT

Computer program products, methods, systems, apparatus, and computing entities are provided for creating and using heterogeneous pools of validators to implement blockchain consensus. The specialized validators can be segmented and pooled based on their roles and functionalities in the consensus mechanism.

21 Claims, 7 Drawing Sheets

(56) References Cited

U.S. PATENT DOCUMENTS

2019/0236559 A1    8/2019   Padmanabhan
2020/0186523 A1\*  6/2020   Kursun ................. H04L 9/3239

OTHER PUBLICATIONS

Peterson, Kevin, et al., A Blockchain-Based Approach to Health Information Exchange Networks, White Paper Submitted in US Department of Health and Human Services Challenge, Jul. 1, 2016, Mayo Clinic, 10 pages, https://www.healthit.gov/sites/default/files/12-55-blockchain-based-approach-final.pdf, Sep. 26, 2018.

\* cited by examiner

ORCHESTRATED CONSENSUS VALIDATION FOR DISTRIBUTED LEDGERS USING HETEROGENEOUS VALIDATION POOLS

BACKGROUND

Distributed ledgers (e.g., blockchains) make an effort to establish transaction consistency and accuracy through various consensus methods. The consensus methods may use a subset of participating validation nodes in the ledger to validate blocks of transactions. The validation nodes that participate in validations may vary from one validation to the next through random selection, rotation, and/or the like. The validation nodes may incorporate an opaque and domain-independent comparison of smart contract results or domain-specific consensus. In such implementations, these approaches are used where all homogenous validation nodes are uniform in their ability to homogeneously validate blocks and/or transactions. Through ingenuity and innovation, various embodiments of the present invention make substantial improvements to current distributed ledger technologies by creating and using heterogeneous pools of validators to implement blockchain consensus.

BRIEF SUMMARY

In general, embodiments of the present invention provide methods, apparatus, systems, computing devices, computing entities, and/or the like.

In accordance with one aspect, a method is provided. In one embodiment, the method comprises receiving, by a node computing entity, a composite validation request for a transaction, wherein the composite validation request comprises a context for the transaction; identifying, by the node computing entity, a configurable orchestration definition based at least in part on the context for the transaction, wherein the configurable orchestration definition (a) is associated with a validation policy, (b) is associated with a reconciliation policy, and (c) is associated with a workflow; providing, by the node computing entity, a first validation request to a first heterogeneous role pool, wherein (a) the first heterogeneous role pool comprises a first plurality of homogeneous validators, and (b) the first validation request is identified in the workflow; providing, by the node computing entity, a second validation request to a second heterogeneous role pool, wherein (a) the second heterogeneous role pool comprises a second plurality of homogeneous validators, and (b) the second validation request is identified in the workflow; receiving, by the node computing entity, a first validation response from the first heterogeneous role pool; receiving, by the node computing entity, a second validation response from the second heterogeneous role pool; and determining, by the node computing entity and based at least on the first validation response and the second validation response, a composite validation response for the validation request.

In accordance with another aspect, a computer program product is provided. The computer program product may comprise at least one computer-readable storage medium having computer-readable program code portions stored therein, the computer-readable program code portions comprising executable portions configured to receive, by a node computing entity, a composite validation request for a transaction, wherein the composite validation request comprises a context for the transaction; identify, by the node computing entity, a configurable orchestration definition based at least in part on the context for the transaction, wherein the configurable orchestration definition (a) is associated with a validation policy, (b) is associated with a reconciliation policy, and (c) is associated with a workflow; provide, by the node computing entity, a first validation request to a first heterogeneous role pool, wherein (a) the first heterogeneous role pool comprises a first plurality of homogeneous validators, and (b) the first validation request is identified in the workflow; provide, by the node computing entity, a second validation request to a second heterogeneous role pool, wherein (a) the second heterogeneous role pool comprises a second plurality of homogeneous validators, and (b) the second validation request is identified in the workflow; receive, by the node computing entity, a first validation response from the first heterogeneous role pool; receive, by the node computing entity, a second validation response from the second heterogeneous role pool; and determine, by the node computing entity and based at least on the first validation response and the second validation response, a composite validation response for the validation request.

In accordance with yet another aspect, a node comprising at least one processor and at least one memory including computer program code is provided. In one embodiment, the at least one memory and the computer program code may be configured to, with the processor, cause the node receive, by a node computing entity, a composite validation request for a transaction, wherein the composite validation request comprises a context for the transaction; identify, by the node computing entity, a configurable orchestration definition based at least in part on the context for the transaction, wherein the configurable orchestration definition (a) is associated with a validation policy, (b) is associated with a reconciliation policy, and (c) is associated with a workflow; provide, by the node computing entity, a first validation request to a first heterogeneous role pool, wherein (a) the first heterogeneous role pool comprises a first plurality of homogeneous validators, and (b) the first validation request is identified in the workflow; provide, by the node computing entity, a second validation request to a second heterogeneous role pool, wherein (a) the second heterogeneous role pool comprises a second plurality of homogeneous validators, and (b) the second validation request is identified in the workflow; receive, by the node computing entity, a first validation response from the first heterogeneous role pool; receive, by the node computing entity, a second validation response from the second heterogeneous role pool; and determine, by the node computing entity and based at least on the first validation response and the second validation response, a composite validation response for the validation request.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF SOME EXAMPLE EMBODIMENTS

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

Figure 1A:
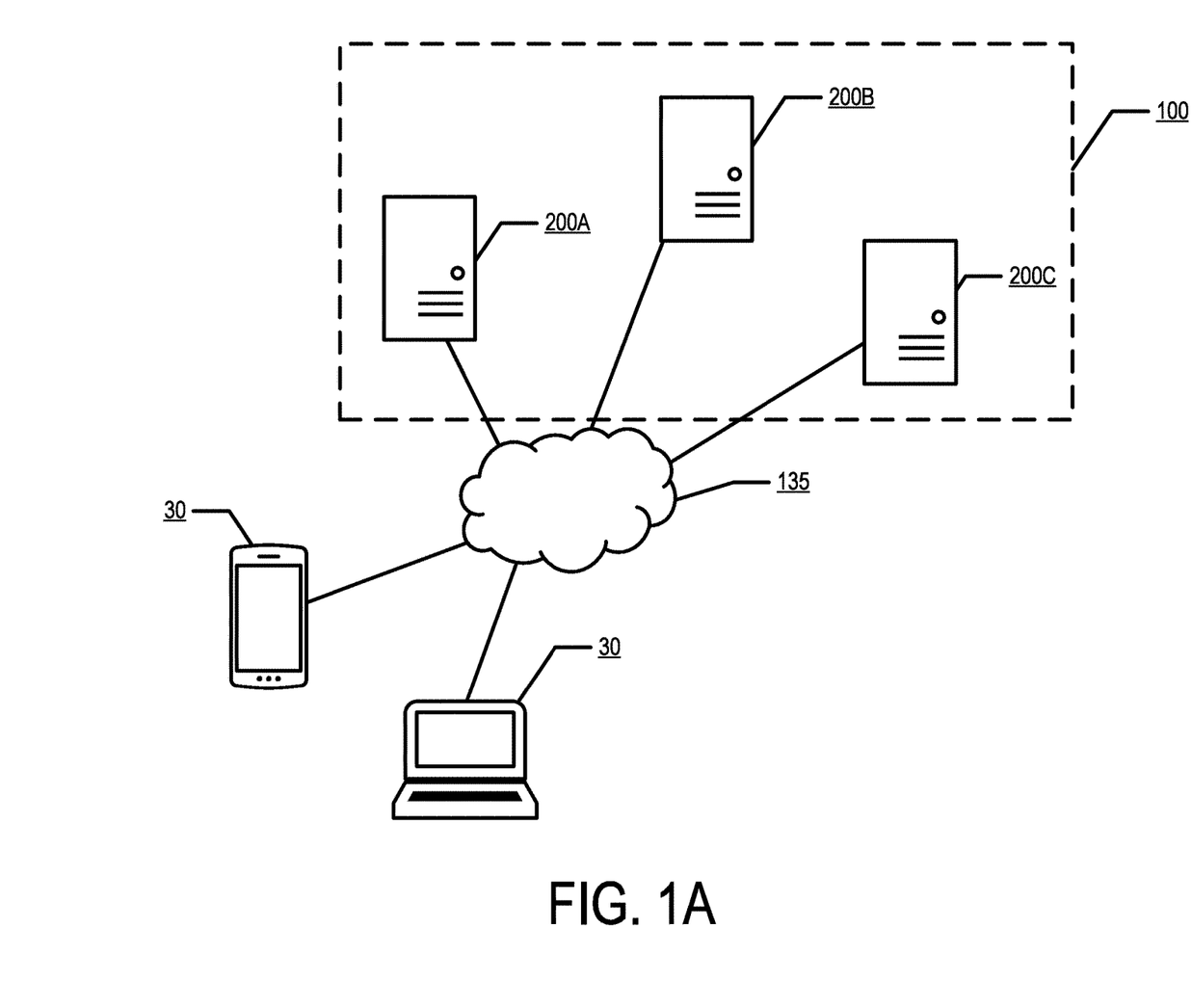
FIG. 1A is an exemplary diagram of a system that can be used to practice various embodiments of the present invention.
Figure 1B:
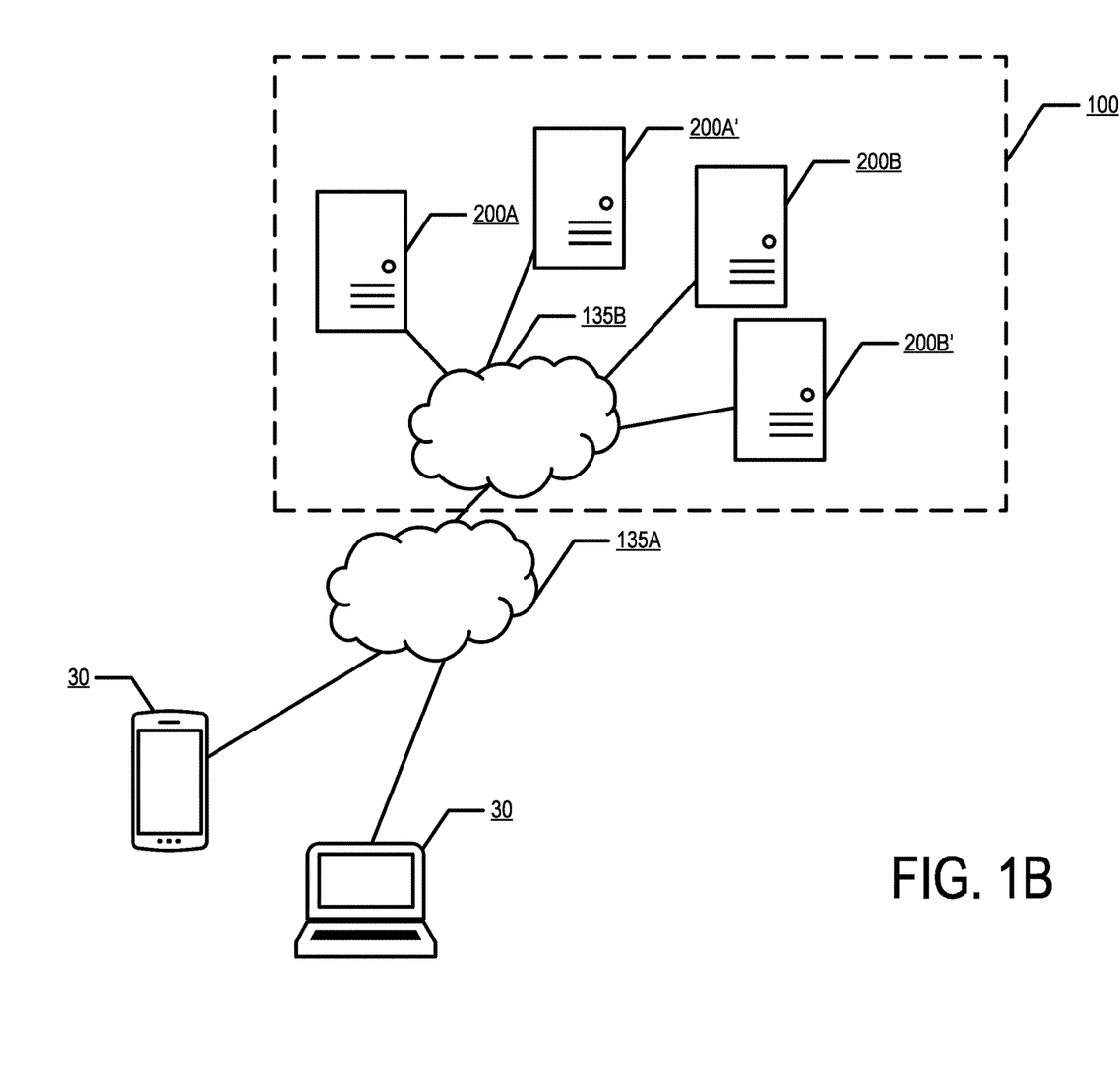
FIG. 1B is an exemplary diagram of another system that can be used to practice various embodiments of the present invention.

FIG. 1A provides an illustration of a system that can be used in conjunction with various embodiments of the present invention. As shown in FIG. 1A, the system may comprise a distributed system 100 comprising two or more node computing entities 200 (e.g., 200A, 200B, 200C)'. As shown in FIG. 1A, the system may further comprise one or more non-node computing entities 30, one or more networks 135, and/or the like. FIG. 1B provides an illustration of another system that can be used in conjunction with various embodiments of the present invention. As shown in FIG. 1B, the system may comprise a distributed system 100 comprising two or more node computing entities 200, 200' and one or more internal networks 135B. For example, in an example embodiment, the distributed system 100 comprises a plurality of node computing entities 200, 200' in communication with one another via a network 135B. For example, the network 135B may be an internal or private network. As shown in FIG. 1B, the system may further comprise one or more non-node computing entities 30, one or more other and/or external networks 135A, and/or the like. For example, the other and/or external network 135A may be external, public, and/or a different network from the internal and/or private network 135B. Each of the components of the system may be in electronic communication with, for example, one another over the same or different wireless or wired networks 135, 135A, 135B including, for example, a wired or wireless Personal Area Network (PAN), Local Area Network (LAN), Metropolitan Area Network (MAN), Wide Area Network (WAN), or the like. Additionally, while FIGS. 1A and/or 1B illustrate certain system entities as separate, standalone entities, the various embodiments are not limited to this particular architecture.

a. Exemplary Node Computing Entity

Figure 2:
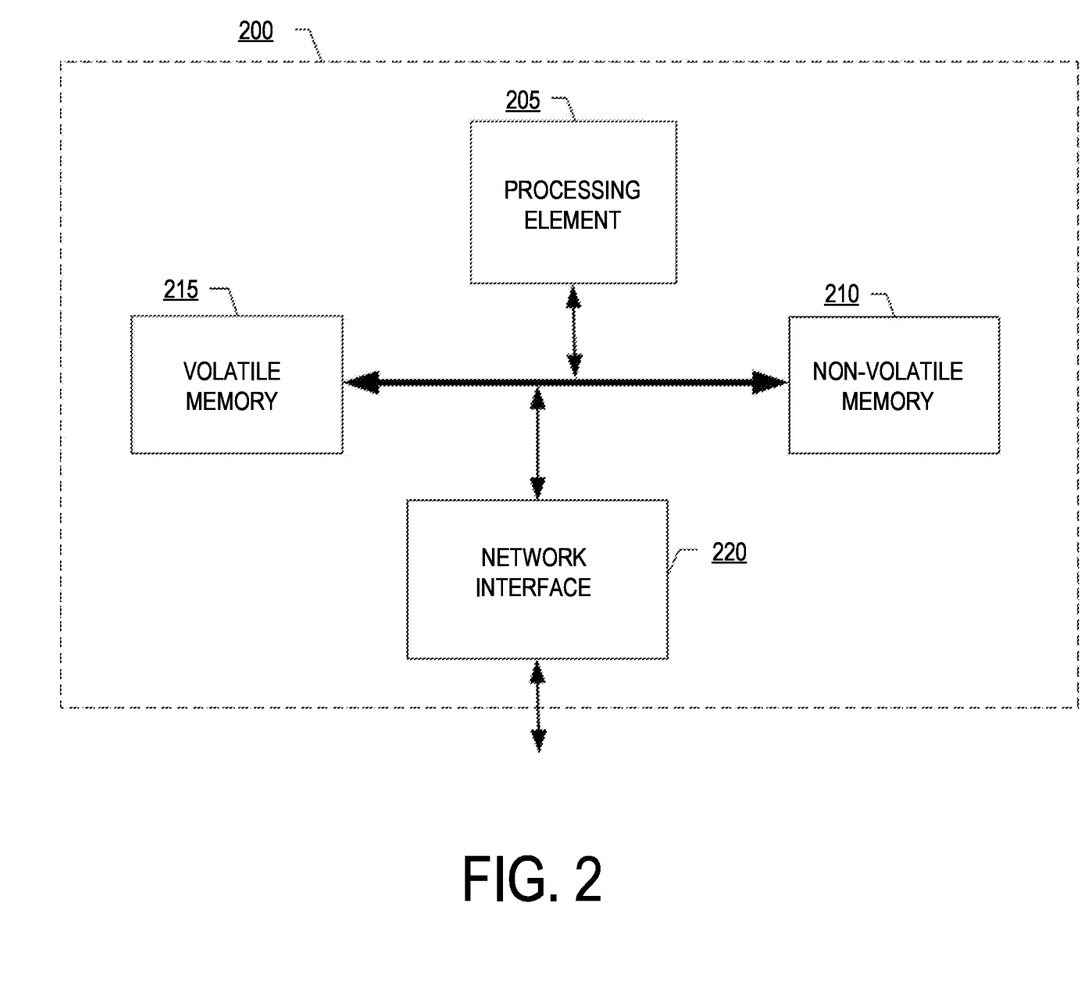
FIG. 2 is an exemplary schematic of a node computing entity in accordance with certain embodiments of the present invention.

FIG. 2 provides a schematic of a node computing entity 200 (e.g., 200A, 200B, 200C) according to one embodiment of the present invention. In general, the terms node computing entity, computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with other node computing entities 200, 200', one or more non-node computing entities 30, and/or the like.

As shown in FIG. 2, in one embodiment, the node computing entity 200 may include or be in communication with one or more processing elements 205 (also referred to as processors, processing circuitry, and/or similar terms used herein interchangeably) that communicate with other elements within the node computing entity 200 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the node computing entity 200 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the node computing entity 200 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the node computing entity 200 with the assistance of the processing element 205 and operating system.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. For instance, the node computing entity 200 may communicate with computing entities or communication interfaces of other node computing entities 200, 200', and/or the like.

As indicated, in one embodiment, the node computing entity 200 may also include one or more network and/or communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the node computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the node computing entity's 200 components may be located remotely from other node computing entity 200 components, such as in a distributed system. Furthermore, one or more of the components may be combined and additional components performing functions described herein may be included in the node computing entity 200. Thus, the node computing entity 200 can be adapted to accommodate a variety of needs and circumstances.

In example embodiments, the node computing entity 200 may be in communication with one or more other node computing entities 200, 200' and/or one or more non-node computing entities 30. In example embodiments, the node computing entity 200 may be in communication with one or more other node computing entities 200, 200' configured for providing transactions, validation requests, and/or the like; performing consensus mechanisms; storing a copy of a distributed ledger; and/or the like.

b. Another Exemplary Node Computing Entity

Figure 3:
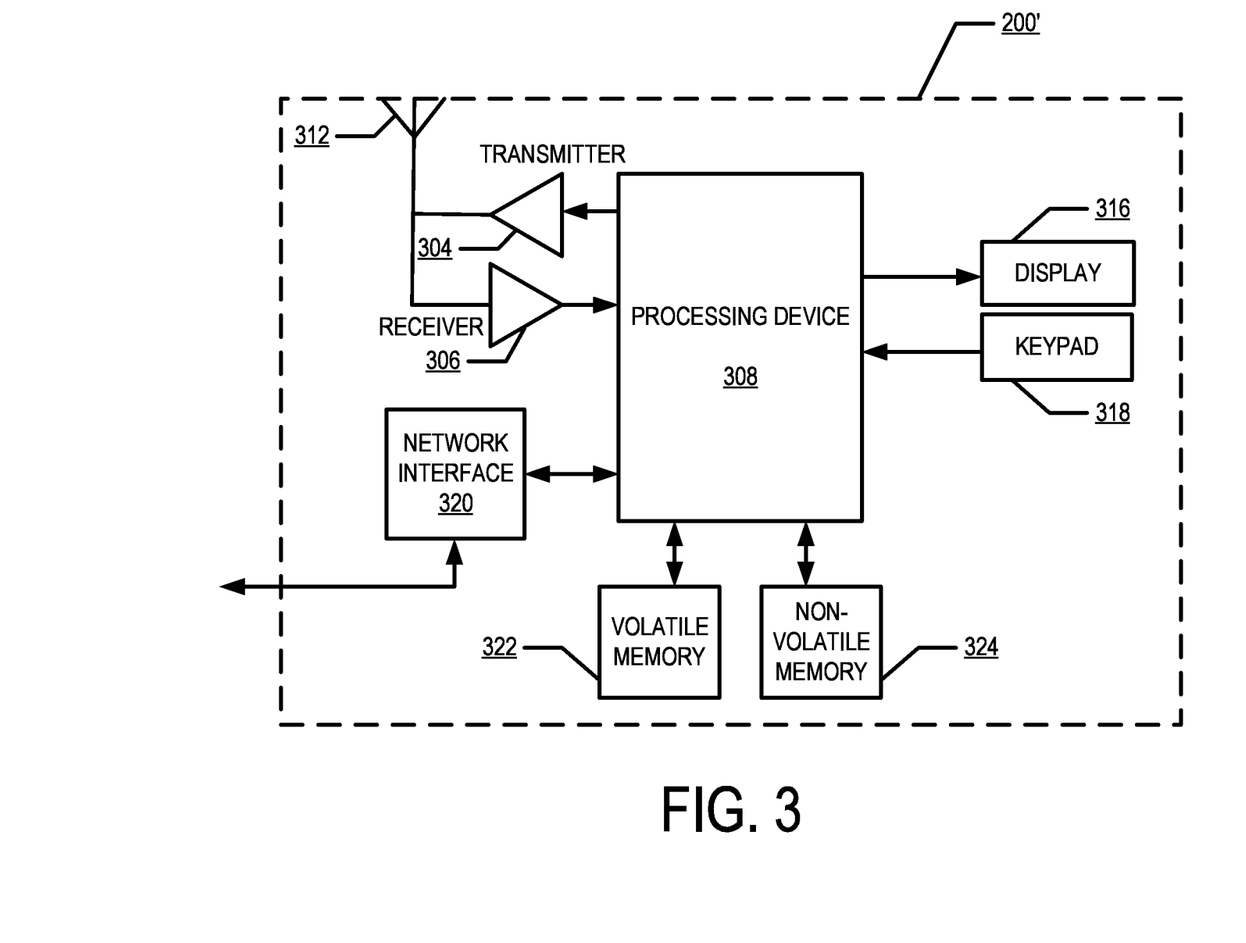
FIG. 3 is an exemplary schematic of another node computing entity in accordance with certain embodiments of the present invention.

FIG. 3 provides an illustrative schematic representative of another node computing entity 200' that can be used in conjunction with embodiments of the present invention. As shown in FIG. 3, a node computing entity 200' can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as another node computing entity 200, 200', one or more non-node computing entities 30, and/or the like. In this regard, the node computing entity 200' may be capable of operating with one or more air interface standards, communication protocols, modulation types, and access types.

More particularly, the node computing entity 200' may operate in accordance with any of a number of wireless communication standards and protocols. In a particular embodiment, the node computing device 200' may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the node computing entity 200' can communicate with various other entities using concepts such as Unstructured Supplementary Service information/data (USSD), Short Message Service (SMS), Multimedia Messaging Service (MIMS), Dual-Tone Multi-Frequency Signaling (DTMF), and/or Subscriber Identity Module Dialer (SIM dialer). The node computing entity 200' can also download changes, add-ons, and updates, for instance, to its firmware, software (e.g., including executable instructions, applications, program modules), and operating system.

According to one embodiment, the node computing entity 200' may include location determining aspects, devices, modules, functionalities, and/or similar words used herein interchangeably. For example, the node computing entity 200' may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the computing entity's 200' position in connection with a variety of other systems, including cellular towers, Wi-Fi access points, and/or the like. Similarly, the node computing entity 200' may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The node computing entity 200' may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the node computing entity 200' to cause display or audible presentation of information/data and for user interaction therewith via one or more user input interfaces. The user input interface can comprise any of a number of devices allowing the node computing entity 200' to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the node computing entity 200' and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the node computing entity 200' can collect information/data, user interaction/input, and/or the like.

The node computing entity 200' can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the node computing entity 200'.

In example embodiments, the node computing entity 200 may be in communication with one or more other node computing entities 200, 200' and/or one or more non-node computing entities 30. In example embodiments, the node computing entity 200 may be in communication with one or more other node computing entities 200, 200' configured for providing transactions, validation requests, and/or the like; performing consensus mechanisms; storing a copy of a distributed ledger; and/or the like.

c. Exemplary Non-Node Computing Entity

In an example embodiment, a non-node computing entity 30 may be a computing entity configured for user interaction (e.g., via one or more user interface devices thereof) for receiving, generating, and/or providing transactions and/or information related thereto. In various embodiments, a user may be a person interacting with a non-node computing entity 30 (e.g., via the user interface devices thereof) or a machine user (e.g., an application, service, and/or the like operating on the non-node computing entity 30). In various embodiments, the non-node computing entity 30 may be a computing entity external to the distributed ledger. For example, a non-node computing entity 30 may be an external authority computing entity, such as a government entity computing device storing and/or providing access to public government records (e.g., death certificates, rules and regulations, police reports, tax records, and/or the like); a weather service computing device storing and/or providing current and/or historical weather information/data, and/or the like. For example, a non-node computing entity 30 may be another computing device operated by and/or on behalf of an external authority and storing and/or providing other information/data that may be requested, accessed, and/or the like by one or more processing objects. For example, a non-node computing entity 30 may be a computing device hosting a website for an entity, and/or the like.

In an example embodiment, a non-node computing entity 30 may be in communication with one or more node computing entities 200, 200' via one or more wired or wireless networks 135. In one embodiment, the non-node computing entity 30 may include one or more components that are functionally similar to those of a node computing entity 200, 200'. For example, in one embodiment, a non-node computing entity 30 may include: (1) a processing element that communicates with other elements via a system interface or bus; (2) one or more user interface devices (e.g., display, touchscreen display, hard or soft keyboard, mouse, and/or the like); (3) transitory and non-transitory memory; and (4) a network and/or communications interface configured to communicate via one or more wired or wireless networks 135. For example, the non-node computing entity 30 may receive user input (e.g., via the user input interface thereof) and provide (e.g., transmit) an indication of the user input to one or more node computing entities 200, 200' (e.g., via the network and/or communications interface).

d. Exemplary Networks

In one embodiment, any two or more of the illustrative components of the architecture of FIGS. 1A and/or 1B may be configured to communicate with one another via respective communicative couplings to one or more networks 135. The networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. BRIEF OVERVIEW OF TECHNICAL CHALLENGES AND TECHNICAL SOLUTION a. Technical Challenges Distributed ledgers (e.g., blockchains) make an effort to establish transaction consistency and accuracy through various consensus methods. The consensus methods may use a subset of participating validation nodes in the ledger to validate blocks of transactions. The validation nodes that participate in validations may vary from one validation to the next through random selection, rotation, and/or the like. The validation nodes may incorporate an opaque and domain-independent comparison of smart contract results or domain-specific consensus. In such implementations, these approaches are used where all homogenous validation nodes are uniform in their ability to homogeneously validate blocks and/or transactions.

However, in some instances, validation node homogeneity is not possible or not desirable. For example, using only homogenous validation nodes and/or only homogeneous validation node pools may result in high computational costs of arriving at a decision and result in system complexity that is cost-prohibitive to scale. Further, the availability or dependence on private information may require information that must not be shared for competitive or legal reasons. For instance, the overall decision to accept a block and/or a transaction may be based on a specific business domain and/or logic/rule, which includes of several specialty decisions that require multiple validator nodes that have different roles and are often times in a dependent manner (e.g., such as a workflow). Moreover, when the validity checking of a block and/or transaction depends on domain-specific logic, one possible approach is to utilize domain-specific consensus. In cases where the domain-specific consensus has the characteristics noted previously (e.g., high computational cost, private data, dependency, and/or the like) the processing objects that are uniformly deployed to the homogenous validation nodes may all call oracle functions that implement the needed function. With this approach, the number of calls to the oracle functions would be very high because they would be replicated by all homogenous validation nodes. Such an implementation would likely place an undue burden on the oracle infrastructure, especially if it is implementing a high-cost or complex function. Further, there is little flexibility in selecting which specialty oracle to use when multiple options exist or to implement aggregate decisions using multiple oracles.

Figure 4:
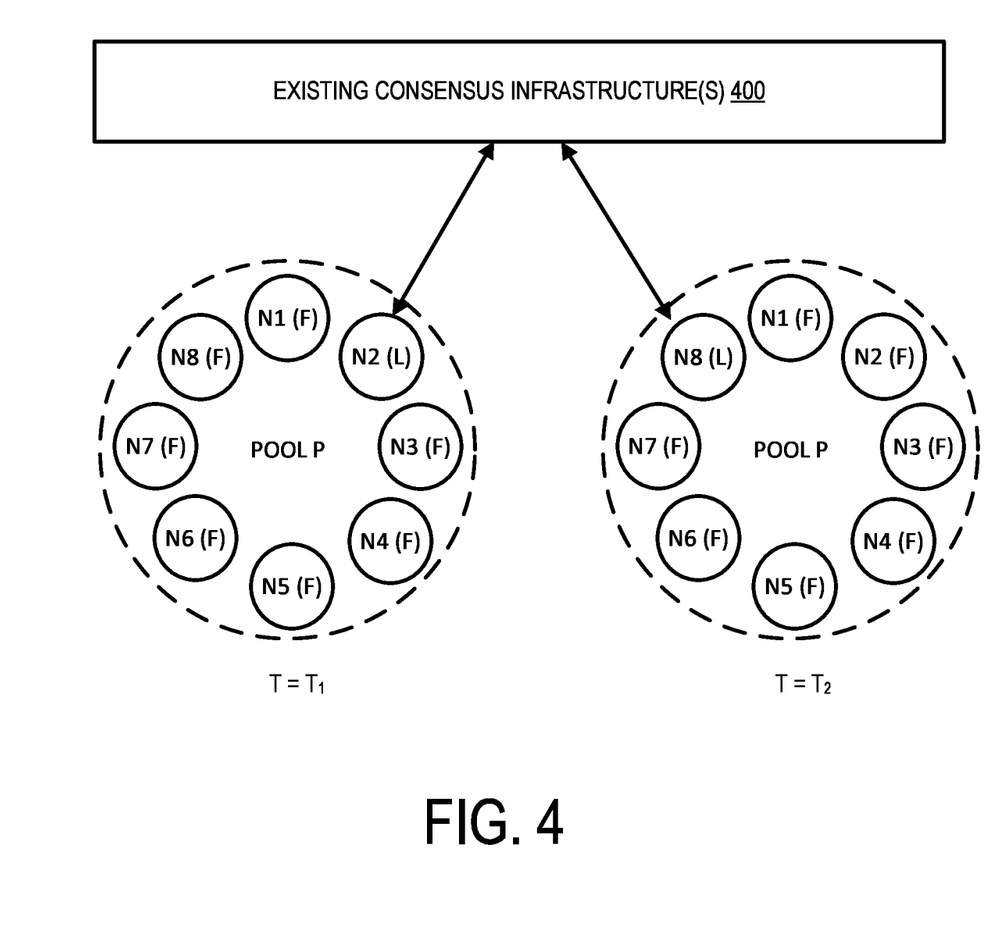
FIG. 4 is an exemplary schematic that includes an existing blockchain solution that uses homogeneous validator nodes.

Additionally, as previously noted, existing blockchain solutions typically use pools of homogeneous validator nodes that are a subset of the overall blockchain network participants, such as those shown in FIG. 4. In FIG. 4, at Time=$T_1$, node N2 is the current leader (L) responsible for validating and committing the next block to the blockchain, with the remaining validators being followers (F). The leader is responsible for aggregating consensus from among the pool. The selection of node N2 as the leader may be Proof of Stake, Proof of Work, Proof of Authority, Proof of Elapsed Time, and or the like. At a later Time=$T_2$, another node N8 may become the leader. These consensus algorithms assume that all validators have the same capability and responsibility. While individual nodes may take on a leader role or a follower role, they are essentially taking on active or passive approaches to the same validation done by others within the same pool.

b. Technical Solutions and Advantages

To overcome at least these technical challenges, embodiments of the present invention provide a technical solution by creating and using heterogeneous pools of validators to implement blockchain consensus. The specialized validators can be segmented and pooled based on their roles and functionalities in the consensus mechanism. This allows for a flexible approval workflow to be natively implemented for consensus and expanded use cases when compared to legacy consensus methods. Thus, where existing solutions use homogenous pools of validators, embodiments of the present invention use heterogeneous pools of validators. Further, where existing solutions use validators with equal functional capabilities, embodiments of the present invention can use validators with different functional capabilities. And where existing solutions select validators from a single pool of validators, embodiments of the present invention can use validators selected from multiple pools of validators. This creates a more robust, flexible, and efficient consensus mechanism. Further, various embodiments may provide for an extension to existing consensus methods, and implementation/realization of domain-specific consensus where one of the processing objects is a role-based processing object, and/or an outright replacement for existing consensus methods.

IV. EXEMPLARY SYSTEM OPERATION

Figure 5:
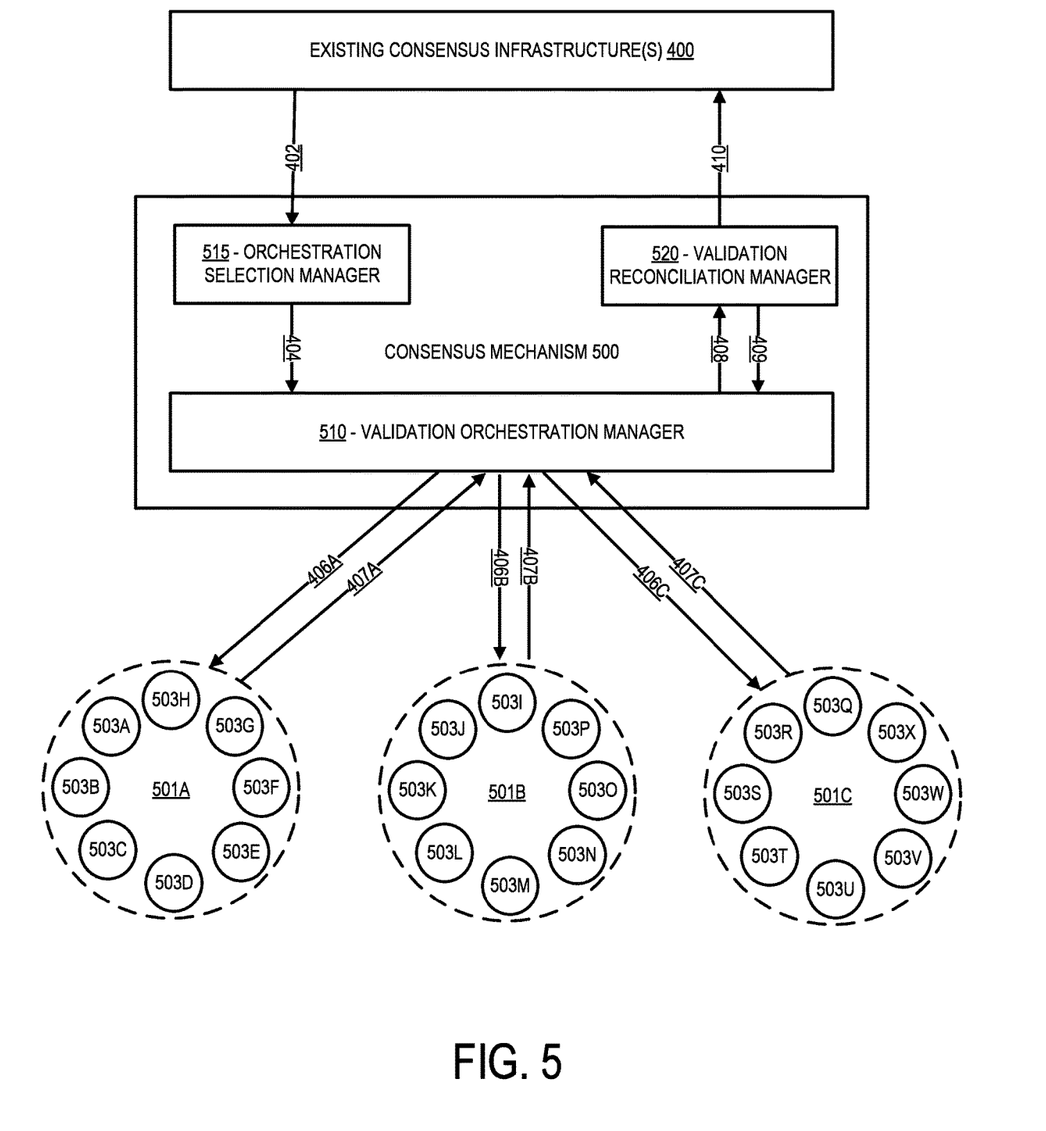
FIG. 5 is an exemplary schematic that includes three validator pools in accordance with certain embodiments of the present invention.
Figure 6:
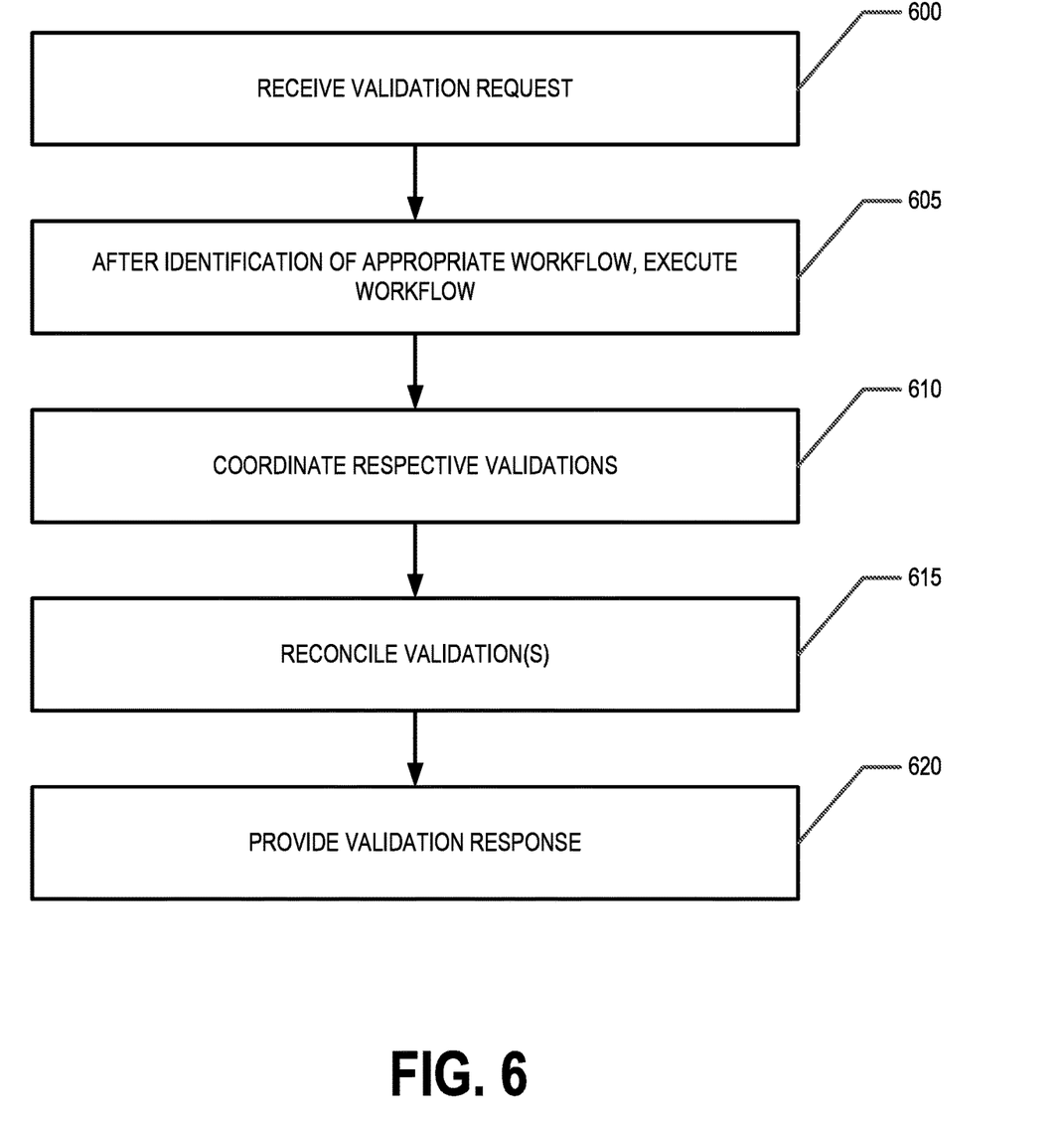
FIG. 6 is a flowchart of exemplary operations, steps, and/or processes in accordance with certain embodiments of the present invention.

Reference will now be made to FIGS. 5 and 6. FIG. 5 is an exemplary schematic that includes three validator pools, and FIG. 6 is a flowchart of exemplary operations, steps, and/or processes.

a. Consensus Mechanism

In various embodiments, distributed ledgers (e.g., blockchains) may use consensus mechanisms (e.g., processes, algorithms, engines) to perform a variety of functions. Some non-limiting examples of core functions of consensus mechanisms 500 may include checking a prior block hash, checking a hash of Merkle root or tree, and/or the like for a transaction; checking permissions of a node computing entity 200, 200' and/or a user associated with a transaction to ensure a node computing entity 200, 200' and/or user has appropriate permissions for providing a transaction; checking that a request would not exceed architectural limits such as the block size; and/or the like.

In addition to performing core functions, consensus mechanisms 500 can perform validation functions to validate transactions and/or blocks of transactions. In one embodiment, a transaction (or a block of transactions) can be provided and/or received via a composite validation request 402. The composite validation request 402 may include the transaction (or block of transactions) and relevant information/data (e.g., domain, type/context, validations/determinations) associated with the transaction for use in validating the transaction and/or block of transactions. In one embodiment, the composite validation request 402 can be provided by an existing consensus infrastructure 400 to the consensus mechanism 500 via one or more networks.

In one embodiment, a transaction may correspond to a particular domain, be of a particular type/context, and/or include or need one or more validations/determinations. In various embodiments, the term domain refers to a particular sphere or area of knowledge, business, industry, and/or the like. Some non-limiting examples of domains are healthcare, finance, retail, digital rights, voting, supply chain management, and/or the like. Thus, if the domain is finance, an example transaction type/context may be an automated request to approve or deny a request for a mortgage. In such an example, the transaction for the automated approval or denial of a mortgage request may include or need one or more validations/determinations. The validations/determinations may be (a) validating/determining if the applicant has the required down-payment in one or more bank accounts, (b) validating/determining whether the applicant has a minimum required credit score with two of the three credit bureaus, (c) validating/determining if the subject property is in a flood zone, (d) validating/determining if the applicant's insurance company is willing to insure the subject property, (e) validating/determining if the resulting mortgage payment would be within an appropriate range given the applicant's income, and/or the like. Depending on their nature, such validations/determinations may be made serially (e.g., be required to be performed in a specific sequence) or in parallel. Moreover, for transactions, a variety of domains, types/contexts, and validations/determinations can be made to adapt to various needs and circumstances.

To validate a transaction and/or a block of transactions, the consensus mechanism 500 may include or be in communication with various components, mechanisms, modules, or functionalities described herein—as orchestration selection managers 515, validation orchestration managers 510, validation pools 501A-501C, validators 503A-503X, validation reconciliation managers 520, and/or the like (as shown in FIG. 5).

c. Orchestration Selection Manager

In one embodiment, the consensus mechanism 500 may include or be in communication with an orchestration selection manager 515. The orchestration selection manager 515 may comprise an inventory of configurable orchestration definitions. A configurable orchestration definition may include a workflow, for example, that defines how a transaction (or block of transactions) in a particular domain, of a specific type/context, and/or with specific needed validations/determinations is to be validated. Such configurable orchestration definitions may be defined, created, and/or modified, for example, by a user interacting with an interface of a non-node computing entity 30.

In one embodiment, a configurable orchestration definition (comprising a workflow of one or more steps/operations) may include an indication of the domains (e.g., healthcare, finance, retail, digital rights, voting, supply chain management, and/or the like) and transaction types/contexts with which it is associated. The transaction types/contexts may indicate the transactions for which the configurable orchestration definition (comprising a workflow of one or more steps/operations) is to be used or with which it can be used. For example, the configurable orchestration definition (comprising a workflow of one or more steps/operations) may indicate its domain is finance and it can be used for automated requests to approve or deny a request for a mortgage. To do so, a collection of key/value pairs may be used for the orchestration inventory. In such an implementation, the key would be the context (e.g. credit check, insurability, etc.) and the value would be the orchestration, validation policy, and reconciliation policy. Alternatively, three separate key/value stores could be used one for each of the orchestrations, validation policies, and reconciliation policies all using a common key for the context.

The configurable orchestration definition (comprising a workflow of one or more steps/operations) may also define the roles that role pools 501A-501C and/or validators 503A-503X are required to perform for validation. Continuing with the above example, each role pool 501A-501C and/or validator 503A-503X may be designated a role of making one or more of the following validations/determinations: (a) validating/determining if the applicant has the required down-payment in one or more bank accounts; (b) validating/determining whether the applicant has a minimum required credit score with two of the three credit bureaus; (c) validating/determining if the subject property is in a flood zone; (d) validating/determining if the applicant's insurance company is willing to insure the subject property; (e) validating/determining if the resulting mortgage payment would be within an appropriate range given the applicant's income; and/or the like.

The configurable orchestration definition (comprising a workflow of one or more steps/operations) may further define the order in which the roles that are to be invoked. In other words, depending on their nature, the roles may be performed serially (e.g., be required to be performed in a specific sequence) or in parallel. For instance, in a serial context, the first validation/determination may be to validate/determine (a) if the applicant has the required down-payment in one or more bank accounts or (b) whether the applicant has a minimum required credit score with two of the three credit bureaus. If the Applicant does not comply with both, depending on the configurable orchestration definition, it may not be necessary to validate/determine (c) if the subject property is in a flood zone; (d) if the applicant's insurance company is willing to insure the subject property; or (e) if the resulting mortgage payment would be within an appropriate range given the applicant's income. However, in a parallel context, the configurable orchestration definition may have each of these validations/determinations being performed in parallel evaluated by the validation reconciliation manager 520. For instance, in such an example, the reconciliation manager 520 may orchestrate some processing such as in the event a veto is decided: the reconciliation manager 520 may terminate the process without proceeding to further validations. As will be recognized, a variety of approaches and techniques can be used to adapt to various needs and circumstances.

Still further, the configurable orchestration definition (comprising a workflow of one or more steps/operations) may optionally reference or embed a validation policy (e.g., majority rule) assigned to the pool. The validation policies may be static or dynamic. A static validation policy can be used to provide a default validation policy for all transactions, unless a dynamic validation policy is provided as part of a validation request communicated through the use of a configurable orchestration definition 404. This allows for a default validation policy to be used and be changed dynamically on a transaction-by-transaction basis if desired. Such validation policies can be referenced by the corresponding configurable orchestration definitions and be subsequently provided to the role pools 501A-501C by the validation orchestration manager 510. Thus, a combination of static validation policies and dynamic validation policies can be used with embodiments described herein.

In one embodiment, the configurable orchestration definition (comprising a workflow of one or more steps/operations) may also identify the reconciliation methodology to be used in validating/determining whether a particular validation/determination (for a transaction or a block of transactions) has been successful. For instance, continuing with the above example, the reconciliation methodology may indicate whether and how the validations/determinations for each of the following should be handled: (a) validating/determining if the applicant has the required down-payment in one or more bank accounts; (b) validating/determining whether the applicant has a minimum required credit score with two of the three credit bureaus; (c) validating/determining if the subject property is in a flood zone; (d) validating/determining if the applicant's insurance company is willing to insure the subject property; (e) validating/determining if the resulting mortgage payment would be within an appropriate range given the applicant's income; and/or the like. As will be recognized, a variety of approaches and techniques can be used to adapt to various needs and circumstances.

The configurable orchestration definition (or the reconciliation methodology) may further include one or more aggregating reconciliation policies, techniques, and approaches that are to be used as part of the reconciliation methodology. Such aggregating reconciliation policies, techniques, and approaches may include (a) a fixed number of specific roles across multiple roles, (b) a percentage of specific roles across multiple roles, (c) a role may have veto authority over all others, (d) majority vote amongst validators within a given role pool, and/or (e) combinations of the same.

Thus, based on the domain, context/type, and/or validations/determinations for a transaction, the orchestration selection manager 515 can identify/determine the appropriate configurable orchestration definition (comprising a workflow of one or more steps/operations) for the transaction. The orchestration selection manager 515 can then provide the validation request (e.g., transaction) through the use of a configurable orchestration definition 404 (or an indication as to the appropriate orchestration definition) to the validation orchestration manager 510.

d. Validation Orchestration Manager

In one embodiment, the consensus mechanism 500 may include or be in communication with a validation orchestration manager 510. The validation orchestration manager 510 may receive the validation request (e.g., transaction) and the configurable orchestration definition 404 (or an indication as to the appropriate orchestration definition) to coordinate validation of the transaction using one or more heterogeneous role pools 501A-501C, each heterogeneous role pool 501A-501C with of one or more validators 503A-503X. A validator 503A-503X may be a node 200, 200', a smart contract, executing entity, and/or the like. In one embodiment, each validator 503A-503X within a 501A-501C pool is homogeneous within the context of that pool 501A-501C; however, they are heterogeneous with respect to other pools.

And as previously noted, each heterogeneous role pool 501A-501C is defined by a corresponding configurable role pool definition and may be one or more nodes in a distributed ledger (including a sidechain). The configurable role pool definition identifies the particular heterogeneous role pool 501A-501C for referencing by the validation orchestration manager 510. The configurable role pool definition may also comprise a default validation policy the heterogeneous role pool 501A-501C uses to validate a transaction. As indicated, the default validation policy can be dynamically changed via a configurable orchestration definition that includes a different validation policy (e.g., dynamically pushed down). In some embodiments, the configurable role pool definition may also comprise an indication of other additional validation policies that are available and can be referenced by the validation orchestration manager 510. The configurable role pool definition may also include an indication that identifies each participating homogeneous validator 503A-503X of the corresponding role pool. The indication identifying a corresponding homogeneous validator 503A-503X may be a corresponding Internet Protocol (IP) address, for example, or other electronically identifying information. Thus, a configurable role pool definition may include a list of participating validators 503A-503X within a role pool 501A-501C. In other words, there is a pool definition for each pool 501A-501C. The pool contains homogeneous validators 503A-503X—with different pools 501A-501C containing different types/roles of validators 503A-503X thereby allowing the pools 501A-501C to be heterogeneous from one another.

With configurable role pool definitions, homogeneous validators 503A-503X are grouped together by their roles into heterogeneous role pools 501A-501C. The roles of the validators 503A-503X are distinguished by others with their specialized capability and admittance into a role pool 501A-501C via the configurable role pool definition. The validators 503A-503X within a given heterogeneous role pool 501A-501C may employ the use of domain specific consensus and/or other techniques and approaches.

In one embodiment, the validation orchestration manager 510 receives the validation request (e.g., transaction) and the configurable orchestration definition 404 (or an indication as to the appropriate orchestration definition) from the orchestration selection manager 515. With that, the validation orchestration manager 510 coordinates the validation of the transaction (or block of transactions) using one or more heterogeneous role pools 501A-501C. That is, the validation orchestration manager 510 invokes/provides individual validation/determination requests and validation policies (e.g., 406A, 406B, 406C) to the one or more heterogeneous role pools 501A-501C based at least in part on the transaction (or block of transactions), the configurable orchestration definition (comprising a workflow of one or more steps/operations), and/or the configurable role pool definition and reconciliation policy. In other words, the validation orchestration manager 510 performs the indicated steps/operations. For instance, the selected orchestration definition (comprising a workflow of one or more steps/operations) may identify one or more heterogeneous validation pools 501A-501C to which individual validation/determination requests should be made. These heterogeneous validation pools 501A-501C have the capability to validate the transaction or one or more aspects of the transaction based on the corresponding configurable role pool definition. This may include making specific validations/determinations.

Continuing with the above example, role pools 501A-501C may be associated with one or more banking entities that can (a) validate/determine if the applicant has the required down-payment in one or more bank accounts, (b) validate/determine whether the applicant has a minimum required credit score with two of the three credit bureaus, and/or (e) validate/determine if the resulting mortgage payment would be within an appropriate range given the applicant's income, and/or the like. To do so, the validation orchestration manager 510 may send individual validation/determination requests and validation policies (e.g., 406A) to heterogeneous role pool 501A and receive individual validation/determination response(s) 407A from role pool 501A based at least in part on the corresponding validation policies. Similarly, role pool 501B may be associated with one or more governmental agencies that can (c) validate/determine if the subject property is in a flood zone. To do so, the validation orchestration manager 510 may send request(s) 406B (with a corresponding validation policy) to role pool 501B and receive validation/determination response(s) 407B from role pool 501B. And role pool 501C may be associated with one or more insurance entities that can (d) validate/determine if the applicant's insurance company is willing to insure the subject property. To do so, the validation orchestration manager 510 may send individual validation/determination requests and validation policies (e.g., 406C) to role pool 501C and receive individual validation/determination response(s) 407C from role pool 501C based at least in part on the corresponding validation policies. As previously noted, the validation orchestration manager 510 may provide individual validation/determination requests and validation policies (e.g., 406A, 406B, 406C) serially or in a parallel. Thus, the individual validation/determination responses 407A, 407B, 407C may also be received serially or in parallel. And as described, in a parallel context, the configurable orchestration definition may have each of these validations/determinations being performed in parallel evaluated by the validation reconciliation manager 520. For instance, in such an example, the reconciliation manager 520 may orchestrate some processing such as in the event a veto is decided: the reconciliation manager 520 may terminate the process without proceeding to further validations. These individual validations/determinations proceed in the manner defined by the configurable orchestration definition (comprising a workflow of one or more steps/operations). Current blockchain implementations are ill-suited to accommodate such processing.

As will be recognized, the validation orchestration manager 510 does not make conclusions based on the validations/determinations. Rather, the validation orchestration manager 510 (and in some implementations the reconciliation manager 520) oversees the validation/determination process in coordinating among the various role pools 501A-501C. And as previously noted, in the parallel context, the validation reconciliation manager 520 may also oversee part of the validation/determination process by provide instructions 409 (e.g., to terminate a validation) in some implementations. Generally, this allows for the configurations of specific orchestration definitions for all or specific transaction. After receiving (e.g., collecting) the validation/determination responses 407A, 407B, 407C, the validation orchestration manager 510 provides the received/collected responses 408 to a validation reconciliation manager 520.

e. Validation Reconciliation Manager

In one embodiment, the consensus mechanism 500 may include or be in communication with a validation reconciliation manager 520. The validation reconciliation manager 520 may receive the validation/determination responses 407A, 407B, 407C and determine the final result of the validation based at least in part on the configurable orchestration definition. The configurable orchestration definition may include one or more validation policies and/or one or more reconciliation policies.

The validation reconciliation manager 520 aggregates the validation/determination responses 407A, 407B, 407C from the validation orchestration manager 510 using one or more aggregating reconciliation policies, techniques, and approaches. For example, the validation reconciliation manager 520 may maintain an inventory (e.g., listing) of aggregating reconciliation policies, techniques, and approaches that have an identity referenced by the configurable orchestration definitions and/or reconciliation methodology. Such aggregating reconciliation policies, techniques, and approaches may include (a) a fixed number of specific roles across multiple roles, (b) a percentage of specific roles across multiple roles, (c) a role may have veto authority over all others, (d) majority vote amongst validators within a given role pool, and/or (e) combinations of the same.

With the appropriate information, the validation reconciliation manager 520 aggregates the validation/response responses 407A, 407B, 407C and determines if they satisfy or meet the criteria for a successful validation defined by the configurable orchestration definition. For example, the validation reconciliation manager 520 aggregates the (a) the validation/determination of whether the applicant has the required down-payment in one or more bank accounts; (b) the validation/determination of whether the applicant has a minimum required credit score with two of the three credit bureaus; (c) the validation/determination of whether the subject property is in a flood zone; (d) the validation/determination of whether the applicant's insurance company is willing to insure the subject property; and (e) the validation/determination of whether the resulting mortgage payment would be within an appropriate range given the applicant's income. The validation reconciliation manager 520 then provides the corresponding composite validation response 410 to the existing consensus infrastructure 400.

f. Process Flow

In one embodiment, with a node selected role-based orchestration, an entity (e.g., node 200, 200') of the distributed ledger provides, and the role-based consensus mechanism 500 receives, a composite validation request 402 (step/operation 600). The role-based orchestration may be selected via a lottery selection process similar to Proof of Work, a leader selection process similar to Proof of Authority, and/or the like. The composite validation request 402 includes a transaction (or a block of transactions) with relevant information/data (e.g., domain, type/context, validations/determinations). In one embodiment, the composite validation request 402 can be provided by an existing consensus infrastructure 400 to the consensus mechanism 500 via one or more networks.

At step/operation 605 of FIG. 6, the orchestration selection manager 515 can identify/determine the appropriate configurable orchestration definition (comprising a workflow of one or more steps/operations) for the transaction based at least in part on the domain, context/type, and/or validations/determinations for a transaction. The orchestration selection manager 515 provides the validation request (e.g., transaction) and the configurable orchestration definition 404 (or an indication as to the appropriate orchestration definition) to validation orchestration manager 510 to coordinate validation of the transaction.

At step/operation 610 of FIG. 6, the validation orchestration manager 510 coordinates the respective validations using one or more heterogeneous role pools 501A-501C, each heterogeneous role pool 501A-501C with of one or more validators 503A-503X. To do so, the validation orchestration manager 510 invokes/provides individual requests and validation policies (e.g., 406A, 406B, 406C) to one or more heterogeneous role pools 501A-501C based at least in part on the transaction (or block of transactions), the configurable orchestration definition (comprising a workflow of one or more steps/operations), and/or the configurable role pool definition. Then, the validation orchestration manager 510 receives corresponding validation/determination responses (e.g., 407A, 407B, 407C) from the one or more heterogeneous role pools 501A-501C and provides the received/collected responses 408 to the validation reconciliation manager 520. And as previously noted, in the parallel context, the validation reconciliation manager 520 may also oversee part of the validation/determination process by provide instructions 409 (e.g., to terminate a validation) in some implementations.

At step/operation 615 of FIG. 6, the validation reconciliation manager 520 aggregates the validation/determination responses 407A, 407B, 407C and determines if they satisfy or meet the criteria for a successful validation defined by the configurable orchestration definition. With the aggregated responses, the validation reconciliation manager 520 determines if the validation responses 407A, 407B, 407C satisfy or meet the criteria for a successful validation defined by the configurable orchestration definition. Then, the validation reconciliation manager 520 provides the corresponding composite validation response 410 to the existing consensus infrastructure 400 (step/operation 620 of FIG. 6).

V. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for execution in a distributed ledger system, the method comprising:
   receiving, by a node computing entity, a composite validation request for a transaction, wherein the composite validation request comprises a context for the transaction;
   identifying, by the node computing entity, a configurable orchestration definition based at least in part on the context for the transaction, wherein the configurable orchestration definition (a) is associated with a validation policy, (b) is associated with a reconciliation policy, and (c) is associated with a workflow identifying at least a first validation request to validate a first aspect of the transaction and a second validation request to validate a second aspect of the transaction;
   providing, by the node computing entity, the first validation request to a first heterogeneous role pool, wherein (a) the first heterogeneous role pool comprises a first plurality of homogeneous validators, and (b) the first validation request is identified in the workflow for validating the first aspect of the transaction;
   providing, by the node computing entity, the second validation request to a second heterogeneous role pool, wherein (a) the second heterogeneous role pool comprises a second plurality of homogeneous validators, and (b) the second validation request is identified in the workflow for validating the second aspect of the transaction;
   receiving, by the node computing entity, a first validation response from the first heterogeneous role pool indicative of a validation of the first aspect of the transaction;
   receiving, by the node computing entity, a second validation response from the second heterogeneous role pool indicative of a validation of the second aspect of the transaction; and
   determining, by the node computing entity and based at least in part on the first validation response and the second validation response, a composite validation response for the validation request.

2. The method of claim 1, wherein (a) the method is performed by a consensus mechanism in the distributed ledger system and (b) the consensus mechanism comprises an orchestration selection manager, a validation orchestration manager, and a reconciliation manager.

3. The method of claim 2, wherein the reconciliation manager determines the composite validation response for the validation request.

4. The method of claim 1, wherein determining the composite validation response comprises aggregating the first validation response and the second validation response based at least in part on an aggregating reconciliation policy.

5. The method of claim 1, wherein the composite validation request is received from an existing consensus infrastructure.

6. The method of claim 1, wherein providing the first validation request further comprises a first validation policy.

7. The method of claim 1, wherein the composite validation request is associated with a domain and a context.

8. A node in a distributed ledger system, the node comprising at least one processor and at least one memory including program code, the at least one memory and the program code configured to, with the processor, cause the node to at least:

receive, by a node computing entity, a composite validation request for a transaction, wherein the composite validation request comprises a context for the transaction;

identify, by the node computing entity, a configurable orchestration definition based at least in part on the context for the transaction, wherein the configurable orchestration definition (a) is associated with a validation policy, (b) is associated with a reconciliation policy, and (c) is associated with a workflow identifying at least a first validation request to validate a first aspect of the transaction and a second validation request to validate a second aspect of the transaction;

provide, by the node computing entity, the first validation request to a first heterogeneous role pool, wherein (a) the first heterogeneous role pool comprises a first plurality of homogeneous validators, and (b) the first validation request is identified in the workflow for validating the second aspect of the transaction;

provide, by the node computing entity, the second validation request to a second heterogeneous role pool, wherein (a) the second heterogeneous role pool comprises a second plurality of homogeneous validators, and (b) the second validation request is identified in the workflow;

receive, by the node computing entity, a first validation response from the first heterogeneous role pool indicative of a validation of the first aspect of the transaction;

receive, by the node computing entity, a second validation response from the second heterogeneous role pool indicative of a validation of the second aspect of the transaction; and determine, by the node computing entity and based at least in part on the first validation response and the second validation response, a composite validation response for the validation request.

9. The node in the distributed ledger system of claim 8, wherein (a) the at least one memory and the program code are configured to, with the processor, cause the node to execute a consensus mechanism in the distributed ledger system and (b) the consensus mechanism comprises an orchestration selection manager, a validation orchestration manager, and a reconciliation manager.

10. The node in the distributed ledger system of claim 9, wherein the reconciliation manager determines the composite validation response for the validation request.

11. The node in the distributed ledger system of claim 8, wherein determining the composite validation response comprises aggregating the first validation response and the second validation response based at least in part on an aggregating reconciliation policy.

12. The node in the distributed ledger system of claim 8, wherein the composite validation request is received from an existing consensus infrastructure.

13. The node in the distributed ledger system of claim 8, wherein providing the first validation request further comprises a first validation policy.

14. The node in the distributed ledger system of claim 8, wherein the composite validation request is associated with a domain and a context.

15. A computer program product for execution by a node in a distributed ledger system, the computer program product comprising at least one non-transitory computer-readable storage medium having computer-readable program code portions stored therein, the computer-readable program code portions configured to, when executed by the node, cause the node to:

receive, by a node computing entity, a composite validation request for a transaction, wherein the composite validation request comprises a context for the transaction;

identify, by the node computing entity, a configurable orchestration definition based at least in part on the context for the transaction, wherein the configurable orchestration definition (a) is associated with a validation policy, (b) is associated with a reconciliation policy, and (c) is associated with a workflow identifying at least a first validation request to validate a first aspect of the transaction and a second validation request to validate a second aspect of the transaction;

provide, by the node computing entity, the first validation request to a first heterogeneous role pool, wherein (a) the first heterogeneous role pool comprises a first plurality of homogeneous validators, and (b) the first validation request is identified in the workflow for validating the first aspect of the transaction;

provide, by the node computing entity, the second validation request to a second heterogeneous role pool, wherein (a) the second heterogeneous role pool comprises a second plurality of homogeneous validators, and (b) the second validation request is identified in the workflow for validating the second aspect of the transaction;

receive, by the node computing entity, a first validation response from the first heterogeneous role pool indicative of a validation of the first aspect of the transaction;

receive, by the node computing entity, a second validation response from the second heterogeneous role pool indicative of a validation of the second aspect of the transaction; and determine, by the node computing entity and based at least in part on the first validation response and the second validation response, a composite validation response for the validation request.

16. The computer program product of claim 15, wherein (a) the computer-readable program portions are configured to, when executed by the node, cause the node to execute a consensus mechanism in the distributed ledger system and (b) the consensus mechanism comprises an orchestration selection manager, a validation orchestration manager, and a reconciliation manager.

17. The computer program product of claim 16, wherein the reconciliation manager determines the composite validation response for the validation request.

18. The computer program product of claim 15, wherein determining the composite validation response comprises aggregating the first validation response and the second validation response based at least in part on an aggregating reconciliation policy.

19. The computer program product of claim 15, wherein the composite validation request is received from an existing consensus infrastructure.

20. The computer program product of claim 15, wherein providing the first validation request further comprises a first validation policy.

21. The computer program product of claim 15, wherein the composite validation request is associated with a domain and a context.

\* \* \* \* \*